(No Model.) 2 Sheets—Sheet 2.

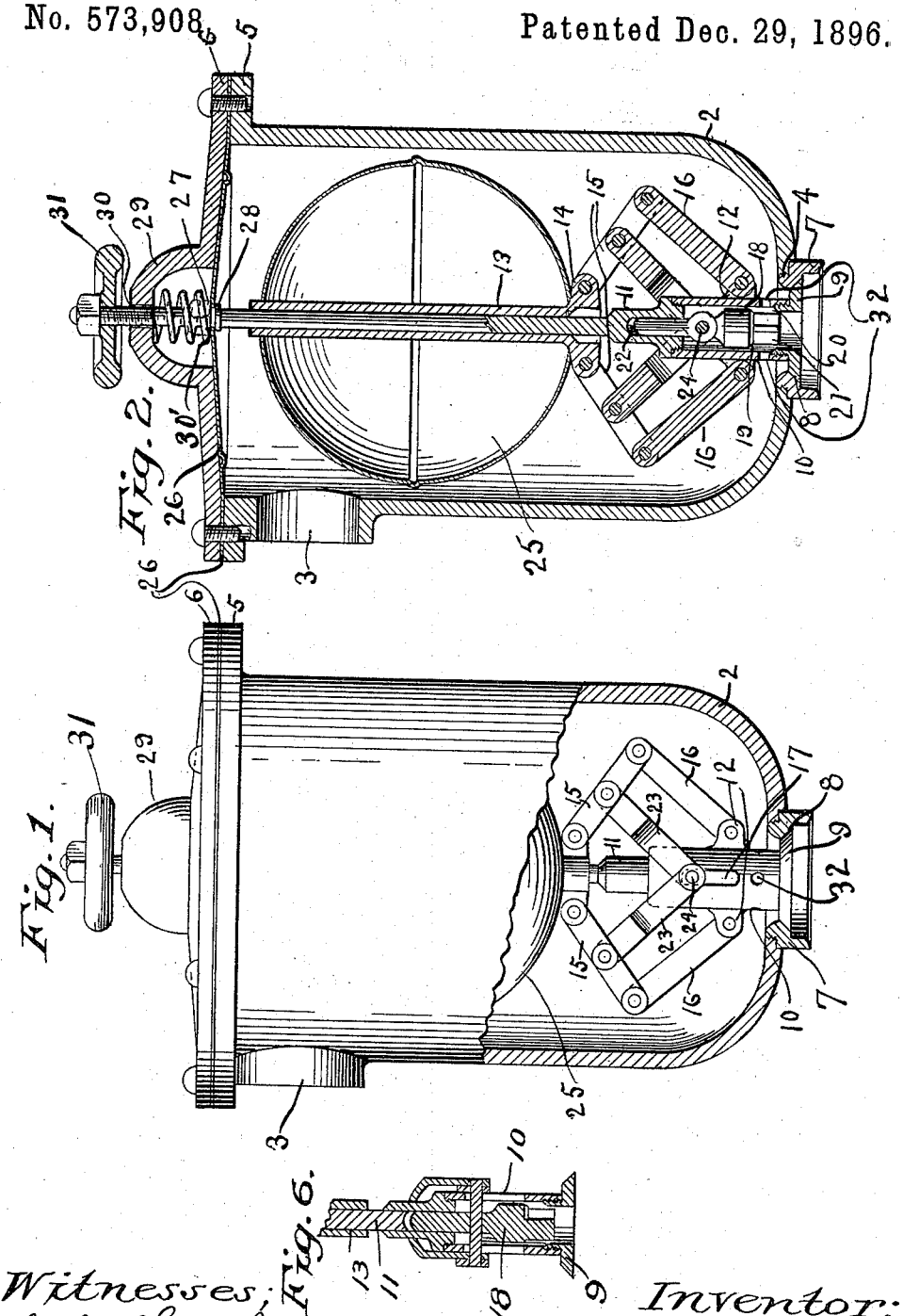

N. NILSON.
AUTOMATIC STEAM TRAP.

No. 573,908. Patented Dec. 29, 1896.

Witnesses:
B. L. Shepherd
Richard Paul

Inventor:
Nils Nilson.
By Paul O. Hawley
his Att'ys

UNITED STATES PATENT OFFICE.

NILS NILSON, OF MINNEAPOLIS, MINNESOTA, ASSIGNOR TO THE NILSON MANUFACTURING COMPANY, OF ST. PAUL, MINNESOTA.

AUTOMATIC STEAM-TRAP.

SPECIFICATION forming part of Letters Patent No. 573,908, dated December 29, 1896.

Application filed August 12, 1895. Serial No. 558,958. (No model.)

*To all whom it may concern:*

Be it known that I, NILS NILSON, of the city of Minneapolis, county of Hennepin, and State of Minnesota, have invented certain new and useful Improvements in Automatic Steam-Traps, of which the following is a specification.

My invention relates to steam-traps; and the object I have in view is to provide a non-freezing trap for use particularly on railroad-trains, and a further object is to provide a trap which will be operative under either high or low steam-pressure. A still further object is to provide a very simple and durable trap which will not easily get out of order and which will very rapidly free itself of water when the steam-pressure has been cut off.

My invention consists generally in various constructions and combinations, all as hereinafter described, and particularly pointed out in the claims.

Figure 4:
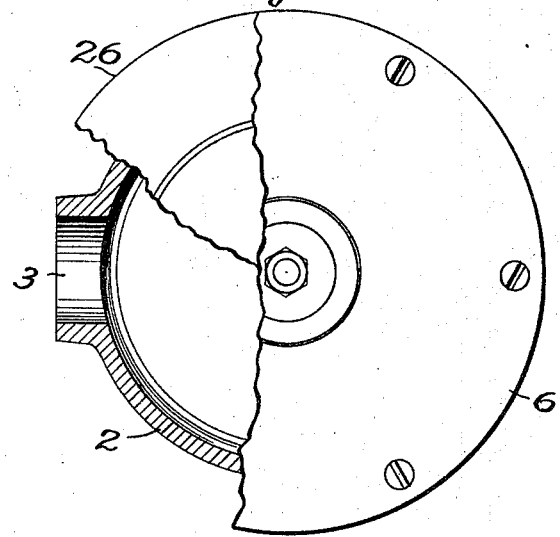
Figure 5:
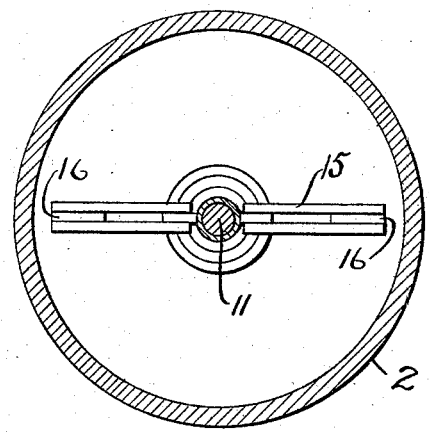
Figure 3:
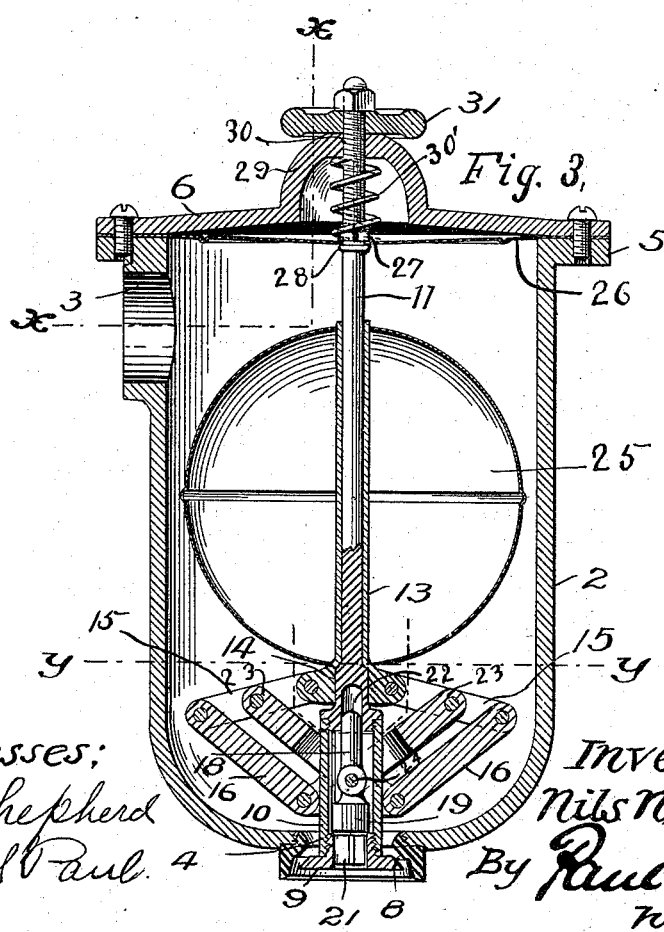

In the accompanying drawings, forming part of this specification, Figure 1 is a side elevation of a trap embodying my invention, a portion of the casing being broken away to show the interior mechanism. Fig. 2 is a vertical section of the same, showing the valve closed. Fig. 3 is a similar view showing the valve open. Fig. 4 is a partial sectional view on the line $x\,x$ of Fig. 3. Fig. 5 is a sectionl view on the line $y\,y$ of Fig. 3. Fig. 6 is a sectional view of the main and auxiliary valve, showing the construction of the same in detail.

In the drawings, 2 represents the cup-shaped main portion of the trap forming the casing, which may be cast in any desired shape, and is provided near its upper edge with an opening 3, through which the steam passes to the interior of the trap. An outlet 4 is provided in the bottom of the trap, through which the water passes when the valve is opened. The casing 2 is provided with a flange 5 at its upper end, to which is secured the cap or cover 6 by means of screws or bolts, as shown in Figs. 2 and 3. The walls of the outlet-opening 4 are threaded to receive the threaded portion 7, having a beveled inner surface forming the valve-seat 8 to receive the disk 9, arranged within the part 7, and extending up through the opening 4 in the bottom of the trap-casing. The disk 9 is provided upon its upper side with a threaded extension to receive the threaded lower end of the tube or cylinder 10, which is threaded at its upper end to receive the threaded lower end of the valve-stem 11, which extends to the top of the trap, and through the cap or cover 6.

The tube 10 is provided upon its opposite sides with lugs 12. A sleeve 13 is provided to slide up and down on the valve-stem 11 above the tube 10, and is provided at its lower end with the lugs 14, to which are pivoted one end of the toggle levers or arms 15, which are in turn pivoted at their opposite end to the arms or levers 16. The opposite ends of the arms 16 are pivoted to the lugs 12.

The tube or cylinder 10 is provided in its opposite sides with longitudinal slots or openings 17, and within the tube or cylinder is arranged an auxiliary valve 18, having a disk 19 to close an opening 20 in the disk 9, through which the water passes to the waste-pipe. The auxiliary valve is also provided below its disk with a guide or spider 21, forming a guide to aid in seating the valve. The valve-stem 11 is provided in its lower end with an opening 22 to receive the upper end of the auxiliary valve 18, which moves up and down therein as the valve is raised or lowered.

Pivoted to the middle portion of the arms or levers 15 are the forked arms 23, which extend upon both sides of the tube or cylinder 10 and are pivoted to the auxiliary valve by a pin 24, which extends through the longitudinal slots provided in the tube or cylinder 10.

Secured to the sleeve 13 is a float 25, which is of the usual shape and construction.

In the upper part of the casing and having its edges secured between the cap or cover 6 and the flange 5, as shown in Figs. 2 and 3, is the diaphragm 26, having a central opening through which passes the valve-stem 11, said stem being provided with a lock-nut 27, by means of which the diaphragm is securely held in position on the stem against a shoulder 28, provided thereon beneath the diaphragm.

The cap 6 is provided with a raised central portion 29, having an opening 30, through which passes the upper end of the valve-stem, and upon said stem between said opening and the diaphragm is arranged the spiral spring 30', the tension of which normally holds the main valve open, so that the trap is always open when not in use. The upper end of the stem 11 above the cap 6 is threaded, and a hand-wheel 31 is provided thereon, by means of which the valve may be opened or closed whenever desired independent of the steam-pressure.

The diaphragm is made, preferably, of metal and of large area, which renders the trap operative under a very low pressure.

The operation of the trap is as follows: When the steam is admitted through the opening at the top of the trap, the diaphragm will be instantly raised, carrying with it the valve-stem 11 and the disk 9, which will strike the seat 8, closing the outlet in the bottom of the casing. As the water accumulates in the trap from the condensation of steam it slowly raises the float 25, opening the auxiliary valve, and flows into the tube or cylinder 10 through the openings 32, provided in the walls thereof, and through the opening 20 in the disk 9, which leads to the waste-pipe beneath the trap. When the pressure is relieved upon the diaphragm, the spring 30' will return the same to its normal position and open the main valve, permitting the rapid escape of any water that may have accumulated in the trap.

Having thus described my invention, I claim as new and desire to secure by Letters Patent—

1. In a steam-trap, the combination, with a casing having an inlet and outlet opening, of a diaphragm arranged therein, a main valve for closing said outlet-opening, and connected to said diaphragm and movable therewith, an auxiliary valve carried by said main valve, and means for moving the same independently of said main valve, substantially as described.

2. In a steam-trap, the combination, with a casing having an inlet and outlet opening, of a diaphragm arranged therein, a main valve having its stem connected to said diaphragm and arranged to close said outlet-opening, an auxiliary valve, a sleeve arranged upon the stem of said main valve, pivotal connections between said sleeve and said auxiliary valve, whereby when said sleeve is raised or lowered said auxiliary valve will be opened or closed, substantially as described.

3. In a steam-trap, the combination with the casing having an inlet and outlet opening, of a diaphragm, a main valve arranged to close said outlet-opening, and having its stem connected to said diaphragm, an auxiliary valve, the sleeve carried by said stem, pivotal connections between said sleeve and said auxiliary valve, and a float carried by said sleeve, whereby the same will be raised and said auxiliary valve opened as the water accumulates in said trap substantially as described.

4. In a steam-trap, the combination with the casing having an inlet and outlet opening, of a diaphragm, a main valve connected thereto, and comprising a seat 8, a disk 9 having an opening 20, a tube or cylinder arranged upon said disk, and provided with openings in its side walls, an auxiliary valve arranged within said tube for covering said opening 20, and means for raising said auxiliary valve, and permitting the water to flow from said trap when said main valve is closed, substantially as described.

5. In a steam-trap, the combination with the casing having the inlet and outlet openings, of the valve for closing said outlet-opening, the diaphragm, the stem 11 connecting said diaphragm and said valve whereby the valve will be opened or closed as the diaphragm is depressed or raised, an auxiliary valve covering an opening leading through said main valve, a float carried by said stem, the pivoted arms 15 and 16 supporting said float thereon, and the arms 23 connecting said arms 15 and said auxiliary valve whereby as said float is raised or lowered said valve will be moved simultaneously, substantially as described.

6. In a steam-trap, the combination, with a casing having an inlet and an outlet opening, of a valve arranged to close said outlet-opening, the tube or cylinder carried by the movable portion of said valve, the diaphragm arranged in the upper part of said casing, the stem connecting said diaphragm and said tube, the auxiliary valve arranged within said tube for covering an opening leading through said first-named valve, said tube being provided with a series of ports or longitudinal slots in the opposite sides thereof, the float 25, the sleeve carried thereby and slidably arranged upon said stem, the arms 15 and 16 connecting said sleeve and said tube, the arms 23 having one end pivoted to said arms 15 and their opposite ends to said auxiliary valve through said longitudinal slots, whereby when said sleeve is raised or lowered said auxiliary valve will be operated simultaneously, substantially as described.

7. In a steam-trap, the combination, with a casing having an inlet and outlet opening, of a diaphragm arranged therein, a main valve having its stem connected to said diaphragm and arranged to close said outlet-opening, an auxiliary valve carried by said main valve, and adapted to close an opening therein, a float arranged upon the stem of said main valve, pivotal connections between said float and said auxiliary valve, whereby when said float is raised by the accumulated water in the trap said auxiliary valve will be opened, and be permitted to close when the water has passed out of the same, substantially as described.

8. In a steam-trap the combination, with a casing having an inlet and outlet opening, a valve arranged in said outlet-opening, a diaphragm arranged in the upper part of said casing opposite said outlet-opening, and connected to the stem of said valve, an auxiliary valve, a series of levers connected thereto, and means adapted to be raised by the accumulated water in the trap for operating said levers and raising said valve, substantially as described.

9. In a steam-trap, the combination with the casing having an inlet and outlet opening, of the diaphragm arranged in the upper part of said casing, the duplex valve for closing said outlet-opening, and comprising a main and auxiliary valve, said main valve having its stem connected to said diaphragm, means for operating said auxiliary valve independently of said main valve, the spring arranged upon said stem above said diaphragm for normally holding said main valve open, the upper end of said stem being threaded, and the handwheel provided thereon, for the purpose set forth.

10. In a steam-trap, the combination with the casing having inlet and outlet openings, of a diaphragm therein, a main valve for closing said outlet-opening, and movable with said diaphragm, an auxiliary valve arranged to be raised and lowered simultaneously with said main valve, and means for operating said auxiliary valve independently of said main valve, substantially as described.

In testimony whereof I have hereunto set my hand this 2d day of August, A. D. 1895.

NILS NILSON.

In presence of—
RICHARD PAUL,
A. C. PAUL.